United States Patent
Abramov et al.

(10) Patent No.: US 8,347,651 B2
(45) Date of Patent: *****Jan. 8, 2013

(54) METHOD OF SEPARATING STRENGTHENED GLASS

(75) Inventors: Anatoli Anatolyevich Abramov, Painted Post, NY (US); Sinue Gomez, Corning, NY (US); Sergio Tsuda, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 986 days.

This patent is subject to a terminal disclaimer.

(21) Appl. No.: 12/388,935

(22) Filed: Feb. 19, 2009

(65) Prior Publication Data

US 2010/0210442 A1    Aug. 19, 2010

(51) Int. Cl.
*B23K 26/14* (2006.01)
*C03B 27/00* (2006.01)
*C03B 27/03* (2006.01)

(52) U.S. Cl. ............. 65/105; 65/112; 65/30.14; 65/114; 219/121.67; 219/121.68; 219/121.69; 219/121.72

(58) Field of Classification Search .......... 219/121.67–121.69, 121.72; 65/105, 65/112, 30.14, 114
See application file for complete search history.

(56) References Cited

U.S. PATENT DOCUMENTS

| | | | |
|---|---|---|---|
| 5,609,284 A | 3/1997 | Kondratenko | |
| 5,776,220 A | 7/1998 | Allaire et al. | |
| 5,984,159 A | 11/1999 | Ostendarp et al. | |
| 6,327,875 B1 * | 12/2001 | Allaire et al. | 65/103 |
| 6,800,831 B1 * | 10/2004 | Hoetzel | 219/121.72 |
| 6,992,026 B2 * | 1/2006 | Fukuyo et al. | 438/797 |
| 7,396,742 B2 * | 7/2008 | Fukuyo et al. | 438/463 |
| 7,547,613 B2 * | 6/2009 | Fukuyo et al. | 438/463 |
| 7,592,238 B2 * | 9/2009 | Fukuyo et al. | 438/463 |
| 7,605,344 B2 * | 10/2009 | Fukumitsu | 219/121.72 |
| 7,608,214 B2 * | 10/2009 | Kuno et al. | 264/400 |
| 7,615,721 B2 * | 11/2009 | Fukuyo et al. | 219/121.61 |

(Continued)

FOREIGN PATENT DOCUMENTS

JP    2008007384 A    1/2008

(Continued)

OTHER PUBLICATIONS

DE 10 2007 009 786 A1 (Krzyzak Marta) Aug. 28, 2008.*

(Continued)

*Primary Examiner* — Jason L. Lazorcik
(74) *Attorney, Agent, or Firm* — Robert P. Santandrea

(57) ABSTRACT

A method is provided for separating or dividing strengthened glass articles, particularly strengthened glass sheets, into at least two pieces, one of which has a predetermined shape and/or dimension. A flaw is initiated in the glass at a depth that is greater than the depth of the strengthened surface layer of the glass, and a vent extending from the flaw is created at a vent depth that is greater than the depth of and outside the strengthened surface layer to at least partially separate the glass. In one embodiment, the vent is generated by treating the glass with a laser to heat the glass to a temperature in a range from about 50° C. below the strain point of the glass up to a temperature between the strain point and the anneal point of the glass. A glass article having at least one strengthened surface and at least one edge having an average edge strength of at least 200 MPa is also described.

23 Claims, 2 Drawing Sheets

U.S. PATENT DOCUMENTS

| | | | |
|---|---|---|---|
| 7,626,137 B2* | 12/2009 | Fukuyo et al. | 219/121.69 |
| 7,626,138 B2* | 12/2009 | Bovatsek et al. | 219/121.69 |
| 7,732,730 B2* | 6/2010 | Fukuyo et al. | 219/121.65 |
| 7,749,867 B2* | 7/2010 | Fukuyo et al. | 438/463 |
| 7,825,350 B2* | 11/2010 | Fukuyo et al. | 219/121.72 |
| 8,043,941 B2* | 10/2011 | Sugiura et al. | 438/463 |
| 8,084,333 B2* | 12/2011 | Sakamoto | 438/460 |
| 8,108,998 B2* | 2/2012 | Inada et al. | 29/890.1 |
| 8,143,141 B2* | 3/2012 | Sugiura et al. | 438/463 |
| 8,183,131 B2* | 5/2012 | Fukuyo et al. | 438/463 |
| 8,188,404 B2* | 5/2012 | Sakamoto | 219/121.68 |
| 8,227,724 B2* | 7/2012 | Fukuyo et al. | 219/121.65 |
| 2002/0006765 A1* | 1/2002 | Michel et al. | 451/28 |
| 2003/0024909 A1* | 2/2003 | Hoekstra et al. | 219/121.69 |
| 2005/0221044 A1 | 10/2005 | Gaume et al. | |
| 2006/0266195 A1 | 11/2006 | Hoetzel et al. | |
| 2007/0151962 A1* | 7/2007 | Doll et al. | 219/121.72 |
| 2008/0286548 A1 | 11/2008 | Ellison et al. | |
| 2009/0046240 A1* | 2/2009 | Bolton | 349/158 |
| 2010/0206008 A1* | 8/2010 | Harvey et al. | 65/105 |
| 2011/0049765 A1* | 3/2011 | Li et al. | 264/400 |
| 2011/0127242 A1* | 6/2011 | Li | 219/121.69 |
| 2011/0127244 A1* | 6/2011 | Li | 219/121.69 |
| 2012/0047956 A1* | 3/2012 | Li | 65/112 |
| 2012/0135853 A1* | 5/2012 | Amin et al. | 501/66 |
| 2012/0145331 A1* | 6/2012 | Gomez et al. | 156/712 |

FOREIGN PATENT DOCUMENTS

| | | |
|---|---|---|
| WO | 2008140818 A2 | 11/2008 |

OTHER PUBLICATIONS

DE 10 2007 009 786 A1 (Krzyzak Marta)—English languagge machine translation.*
JP 2008-007384—English language machine translation.*
U.S. Appl. No. 12/277,573, by Matthew J. Dejneka et al, entitled "Glasses Having Improved Toughness and Scratch Resistance", filed Nov. 25, 2008.
U.S. Appl. No. 61/067,130, by Matthew J. Dejneka et al, entitled "Fining Agents for Silicate Glasses", filed Feb. 26, 2008.
U.S. Appl. No. 61/067,732, by Matthew J. Dejneka et al, entitled "Ion-Exchanged, Fast Cooled Glasses", filed Feb. 29, 2008.
U.S. Appl. No. 61/087,324, by Kristen L. Barefoot et al, entitled "Chemically Tempered Cover Glass" filed Aug. 8, 2008.
U.S. Appl. No. 61/079,995 by Douglas C. Allan et al, entitled "Glass With Compressive Surface for Consumer Applications", filed Jul. 11, 2008.
U.S. Appl. No. 61/084,398, by Christopher M. Lee et al, entitled "Dual Stage Ion Exchange for Chemical Strengthening of Glass" filed Jul. 29, 2008.
Patent Abstract of Japan 2004-352535, published Dec. 16, 2004, Chemically Toughened Glass, Nishi Mizuki et al.
A. Abramov et al; High Speed Laser Scoring of Low Coefficient of Thermal Expansion (CTE) Glass Substrates FMC2-1.
Zhimalov, A.B. et al: "Laser Cutting of Float Glass during Production", Glass and Ceramics, Science for Glass Production, vol. 63, Nos. 9-10, 2006.

* cited by examiner

METHOD OF SEPARATING STRENGTHENED GLASS

BACKGROUND

The induction of surface compressive stress profiles in glass is a well known approach for strengthening glass. In particular, thermal tempering or chemical strengthening of glass using the ion-exchange process can be used to incorporate residual stresses in the glass. Chemical strengthening by ion exchange includes exposing a glass containing alkali ions to a molten salt bath that contains alkali ions that are larger than those initially in the glass. Due to chemical potential differences some ions in the glass are replaced by the larger ions creating a layer of larger volume which leads to the development of compressive stress in the surface of the glass and, consequently, a compensating tensile stress in the interior in order to maintain equilibrium of forces.

While either thermal tempering or chemical strengthening makes glass strong and damage resistant, the residual stresses in the glass make cutting or separating chemically strengthened glass difficult. In particular, the use of mechanical scoring to cut strengthened glasses in which the strengthened layer has a depth in excess of about 20 µm and compressive stresses of greater than about 400 MPa often results in uncontrollable crack propagation and, in some cases, shattering of the glass. Even if mechanical scoring of a strengthened glass is possible, the quality of the resulting edge is likely to be poor, especially in the case of glass pieces of greater thickness.

SUMMARY

A method is provided for separating or dividing strengthened glass articles, particularly strengthened glass sheets, that have been strengthened by either thermal tempering or chemical strengthening into at least two pieces, wherein at least one of the pieces has a predetermined shape or dimensions. A flaw is initiated in the glass at a depth that is greater than the depth of the strengthened surface layer (also referred to herein as the "depth of layer") of the glass, and a vent originating at the flaw and extending through the glass sheet in a separation direction is created at a vent depth that is greater than the depth of and outside the strengthened surface layer to at least partially separate the glass. In one embodiment, the vent is generated by treating the glass with a laser to heat the glass to a temperature in a range from about 50° C. below the strain point of the glass and a temperature between the strain point and the anneal point. A glass article having at least one chemically strengthened surface and at least one edge formed by the method of separating and having an average edge strength of at least 200 MPa is also described.

Accordingly, one aspect of the disclosure is to provide a method of separating a strengthened glass sheet into at least two pieces. The method comprises: providing the strengthened glass sheet, the strengthened glass sheet having a strain point, an anneal point, a thickness, and a first surface and a second surface that are substantially parallel to each other and joined by a plurality of edges, wherein at least one of the first surface and the second surface has a strengthened surface layer under a compressive stress, the strengthened surface layer extending from the surface to a depth of layer; initiating a flaw at a flaw depth within the strengthened glass sheet, wherein the flaw depth is greater than and outside the depth of layer; and forming a vent in the strengthened glass sheet to at least partially separate the strengthened glass sheet into the at least two pieces, wherein the vent originates at the flaw and extends from the flaw in a separation direction along the strengthened glass sheet is at a vent depth that is greater than or equal to the depth of layer.

A second aspect of the disclosure is to provide a method of forming a vent in a strengthened glass sheet. The strengthened glass sheet has a strain point and an anneal point, a central region under a tensile stress, and a strengthened surface layer that is under a compressive stress and extends from the surface to a depth of layer. The method comprises: initiating a flaw at a flaw depth within the strengthened glass sheet, wherein the flaw depth is greater than and outside the depth of layer; and irradiating the strengthened glass sheet with a laser beam and heating the glass at a vent depth to a temperature in a range from about 50° C. below the strain point up to a temperature between the strain point and the anneal point to form the vent, wherein the vent depth is greater than or equal to the depth of layer, and wherein the vent originates at and extends from the flaw.

A third aspect of the disclosure is to provide a strengthened glass article. The strengthened glass article has a central region under a tensile stress, and at least one strengthened surface layer that is under a compressive stress and extends from the surface to a depth of layer, and at least one edge, wherein the at least one edge has an average edge strength of at least 200 MPa.

These and other aspects, advantages, and salient features will become apparent from the following detailed description, the accompanying drawings, and the appended claims.

DETAILED DESCRIPTION

Figure 1:
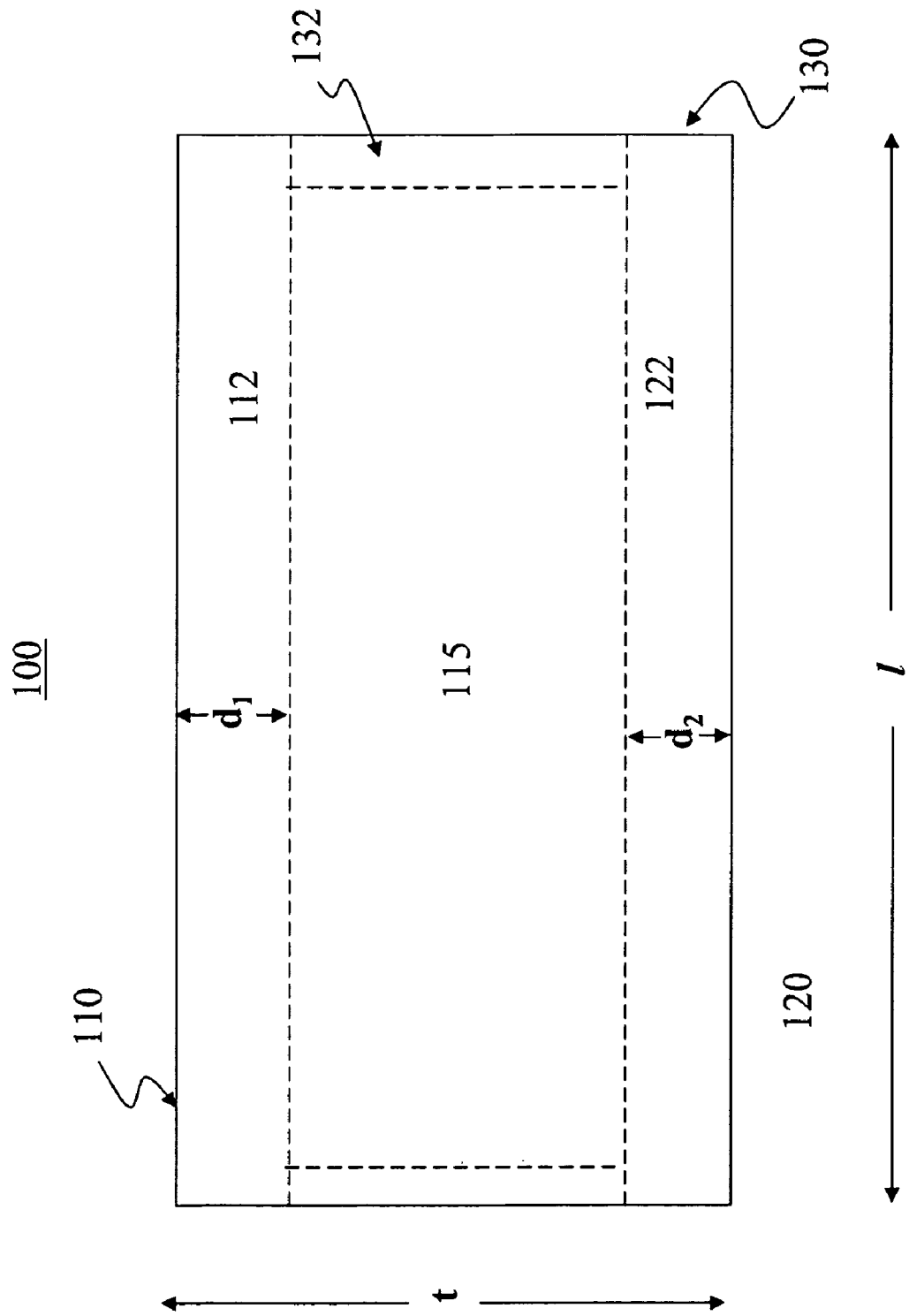
FIG. 1 is a schematic cross-sectional view of a strengthened glass sheet.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range.

Referring to the drawings in general and to FIG. 1 in particular, it will be understood that the illustrations are for the purpose of describing a particular embodiment and are not intended to limit the disclosure thereto. The drawings are not necessarily to scale, and certain features and certain views of the drawings may be shown exaggerated in scale or in schematic in the interest of clarity and conciseness.

As used herein, the term "strain point" refers to the temperature at which the viscosity q of a glass equals $10^{14.5}$ Poise, and the term "anneal point" refers to the temperature at which the viscosity η of a glass equals $10^{13}$ Poise.

A glass sheet may be strengthened either thermally or chemically. In thermal strengthening (also referred to herein as "thermal tempering"), a glass sheet is heated up to a temperature that is greater than the strain point of the glass but below the softening point of the glass and rapidly cooled to a temperature below the strain point to create strengthened layers at the surfaces of the glass. Alternatively, a glass sheet may be strengthened chemically by a process known as ion exchange. In this process, ions in the surface layer of the glass are replaced by—or exchanged with—larger ions having the same valence or oxidation state. Ion exchange processes are typically carried out by immersing glass in a molten salt bath containing the larger ions. In alkali aluminosilicate glasses, for example, smaller alkali metal cations, such as lithium, in the glass may be replaced by larger alkali metal cations, such as sodium, potassium, rubidium, or cesium. Similarly, sodium ions in the glass may be replaced by larger ions such as potassium, rubidium, or cesium. The replacement of smaller ions with larger ions creates a surface layer of larger volume leads to the development of compressive stress in the surface layer of the glass. Consequently, a compensating tensile stress develops in the inner region of the glass in order to preserve equilibrium between forces.

While thermal and chemical strengthening make glass strong and damage resistant, the residual stresses in the glass make cutting or separating strengthened glass difficult. In particular, attempts to cut strengthened glasses having depths of layer in excess of about 20 μm and compressive stresses of greater than about 400 MPa by mechanical scoring often result in uncontrollable crack propagation and, in some cases, shattering of the glass. Even if mechanical scoring of a strengthened glass is possible, the quality of the resulting edge is likely to be poor, especially in the case of thicker glass pieces.

Accordingly, a solution to the problem of cutting or separating of strengthened glasses—particularly for glasses that are chemically strengthened by ion exchange—is provided by a method for controllably dividing, separating, or cutting such glasses, described herein. As used herein, terms such as "cutting," "dividing," and "separating" are used interchangeably and refer to the separation or division of a glass article, such as a sheet, into two or more pieces by physical means. The separation is guided or controlled in the sense that the glass is divided substantially along a desired or predetermined plane or line to obtain at least two pieces, wherein at least one of the pieces has a desired or predetermined geometry and dimensions, as opposed being divided into pieces of random size and/or shape. The method described herein in one embodiment comprises providing a strengthened glass sheet, initiating a flaw in the strengthened glass sheet at a flaw depth below the depth of a strengthened layer, or depth of layer, of the strengthened glass sheet, forming a vent that originates at and extends from the flaw in the strengthened glass sheet at a depth greater than the depth of layer, and creating a stress to separate the strengthened glass sheet along the vent into at least two pieces having desired geometries and dimensions.

In a first step, the method includes providing a chemically strengthened glass sheet having a first surface and a second surface that are substantially parallel to—or conform to the shape of—each other. The strengthened glass sheet need not be planar. The strengthened glass sheet may be a three dimensional sheet having, for example, at least one curved surface, or the like. The first and second surfaces are connected or joined to each other by at least one edge. At least one of the first surface and the second surface has a strengthened surface layer that is under compressive stress and extends from the surface into the glass to a depth of layer. In one embodiment, both the first and second layer has a strengthened surface layer.

A cross-sectional view of a strengthened glass sheet is schematically shown in FIG. 1. Strengthened glass sheet 100 has a thickness t and length l, a first surface 110 and second surface 120 that are substantially parallel to each other, and edges 130 joining first surface 110 to second surface 120. Glass sheet 100 is either thermally or chemically strengthened and has strengthened surface layers 112, 122 extending from first surface 110 and second surface 120 to depths $d_1$, $d_2$, below each surface, respectively. Strengthened surface layers 112, 122 are under compressive stress. In addition, strengthened glass sheet 100 has a central region 115 that is under tension, or tensile stress. The depths $d_1$, $d_2$ to which the strengthened surface layers 112, 122 extend are generally referred to individually as the "depth of layer." In another embodiment, only one of first surface 110 and second surface 120 is strengthened; e.g., first surface 110 is chemically or thermally strengthened and has a strengthened surface layer 112, whereas second surface 120 is not strengthened. A portion 132 of edge 130 may also be strengthened as a result of the strengthening process. Thickness t is at least about 100 μm (0.1 mm) and is generally in a range from about 100 μm up to about 3 mm. In one embodiment, is in a range from about 500 μm (0.5 mm) up to about 3 mm.

The methods described herein are used to separate any glass that is either thermally or chemically strengthened by those means known in the art. In one embodiment, the strengthened glass is an alkali aluminosilicate glass. In one embodiment, the glass has comprises 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % $\leq Li_2O+Na_2O+K_2O \leq 20$ mol % and 0 mol % $\leq$ MgO+CaO $\leq 10$ mol %. In another embodiment, the glass comprises 64 mol % $\leq SiO_2 \leq 68$ mol %; 12 mol % $\leq Na_2O \leq 16$ mol %; 8 mol % $\leq Al_2O_3 \leq 12$ mol %; 0 mol % $\leq B_2O_3 \leq 3$ mol %; 2 mol % $\leq K_2O \leq 5$ mol %; 4 mol % $\leq$ MgO $\leq 6$ mol %; and 0 mol % $\leq$ CaO $\leq 5$ mol %, wherein: 66 mol % $\leq SiO_2+B_2O_3+$ CaO $\leq 69$ mol %; $Na_2O+K_2O+B_2O_3$+MgO+CaO+SrO>10 mol %; 5 mol % $\leq$ MgO+CaO+SrO $\leq 8$ mol %; $(Na_2O+B_2O_3)-Al_2O_3 \leq 2$ mol %; 2 mol % $\leq Na_2O-Al_2O_3 \leq 6$ mol %; and 4 mol % $\leq (Na_2O+K_2O)-Al_2O_3 \leq 10$ mol %. In one particular embodiment, the glass has the composition: 66.7 mol % $SiO_2$; 10.5 mol % $Al_2O_3$; 0.64 mol % $B_2O_3$; 13.8 mol % $Na_2O$; 2.06 mol % $K_2O$; 5.50 mol % MgO; 0.46 mol % CaO; 0.01 mol % $ZrO_2$; 0.34 mol % $As_2O_3$; and 0.007 mol % $Fe_2O_3$. In another embodiment, the glass has the composition: 66.4 mol % $SiO_2$; 10.3 mol % $Al_2O_3$; 0.60 mol % $B_2O_3$; 4.0 mol % $Na_2O$; 2.10 mol % $K_2O$; 5.76 mol % MgO; 0.58 mol % CaO; 0.01 mol % $ZrO_2$; 0.21 mol % $SnO_2$; and 0.007 mol % $Fe_2O_3$. The glass may, in some embodiments, be substantially free of lithium, whereas in other embodiments, the glass may be substantially free of at least one of arsenic, antimony, and barium. The glass may also be down drawable; i.e., formable by methods such as slot draw or fusion draw processes that are known in the art. In these instances, the glass has a liquidus viscosity of at least 130 kpoise. Non-limiting examples of such alkali aluminosilicate glasses are described in U.S. patent application Ser. No. 11/888,213, by Adam J. Ellison et al., entitled "Down-Drawable, Chemically Strengthened Glass for Cover Plate," filed on Jul. 31, 2007, which claims priority from U.S. Provisional Patent Application 60/930,808, filed on May 22, 2007, and having the same title; U.S. patent application Ser. No. 12/277,573, by Matthew J. Dejneka et al., entitled "Glasses Having Improved Toughness and Scratch Resistance," filed on Nov. 25, 2008, which claims priority from U.S. Provisional Patent Application 61/004,677, filed on Nov. 29, 2007, and having the same title; U.S. Provisional Patent Application No. 61/067,130, by Matthew J. Dejneka et al., entitled "Fining Agents for Silicate Glasses," filed Feb. 26, 2008; U.S. Provisional Patent Application No. 61/067,732, by Matthew J. Dejneka et al., entitled "Ion-Exchanged, Fast Cooled Glasses," filed Feb. 29, 2008; and U.S. Provisional Patent Application No. 61/087,324, by Kristen L. Barefoot et al., entitled "Chemically Tempered Cover Glass," filed Aug. 8, 2008, the contents of which are incorporated herein by reference in their entirety.

As previously described herein, the glass, in one embodiment, is chemically strengthened by an ion exchange process in which ions in the surface layer of the glass are replaced by larger ions having the same valence, or oxidation state. In one particular embodiment, the ions in the surface layer and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$ or the like.

In a non-limiting example, alkali aluminosilicate glass samples were cut using the methods described herein. The samples had a composition within the ranges described hereinabove. Each sample was strengthened by ion-exchange by immersion in a molten salt bath consisting of $KNO_3$ at 410° C. Immersion times ranged from about 0.5 hour up to about to 7 hours. The ion exchange treatments resulted in strengthened glasses having depths of layer ranging from about 10 up to at least 50 μm with a compressive stress ranging from about 200 MPa up to about 800 MPa.

In one embodiment, the depth of layer of the strengthened glass is at least 20 μm. The compressive depth of layer has a compressive stress of at least 200 MPa and a central tension of less than about 100 MPa. Compressive stress and depth of layer are typically measured using the optical waveguide effect induced by the change in the refractive index of the exchanged layer compared to the base glass.

Ion exchange processes are typically carried out by immersing glass in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass as a result of the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion items range from about 15 minutes up to about 16 hours.

Non-limiting examples of ion exchange processes are provided in the U.S. patent applications and provisional patent applications that have been previously referenced hereinabove. In addition, non-limiting examples of ion exchange processes in which glass is immersed in multiple ion exchange baths, with washing and/or annealing steps between immersions, are described in U.S. Provisional Patent Application No. 61/079,995, by Douglas C. Allan et al., entitled "Glass with Compressive Surface for Consumer Applications," filed Jul. 11, 2008, in which glass is strengthened by immersion in multiple, successive, ion exchange treatments in salt baths of different concentrations; and U.S. Provisional Patent Application No. 61/084,398, by Christopher M. Lee et al., entitled "Dual Stage Ion Exchange for Chemical Strengthening of Glass," filed Jul. 29, 2008, in which glass is strengthened by ion exchange in a first bath is diluted with an effluent ion, followed by immersion in a second bath having a smaller concentration of the effluent ion than the first bath. The contents of U.S. Provisional Patent Application Nos. 61/079,995 and No. 61/084,398 are incorporated herein by reference in their entirety.

In another embodiment, strengthened glass sheet 100 may be strengthened by thermal tempering. In this technique, strengthened glass sheet 100 is heated up to a temperature that is greater than the strain point of the glass and rapidly cooled to a temperature below the strain point to create strengthened layers 112, 122.

After providing strengthened glass sheet 100, a flaw is initiated in the glass sheet. The initial flaw (140 in FIG. 2) is initiated outside the strengthened surface layer 112 at a flaw depth $d_3$ (FIG. 2) that is greater than or equal to depth of layer $d_1$. In one embodiment, shown in FIG. 2, flaw 140 is initiated on edge 130 and first surface 110, and extends through the depth of strengthened surface layer 112 and into central region 115. Alternatively, flaw 140 can be initiated on edge 130 and second surface 120, and extends through the depth of strengthened surface layer 112 and into central region 115. Flaw 140 may, in one embodiment, be created by mechanical means, such as scribing or the like. Alternatively, flaw 140 may be initiated by short laser pulses having nanosecond length or less (e.g., picosecond and femtosecond length).

Figure 2:
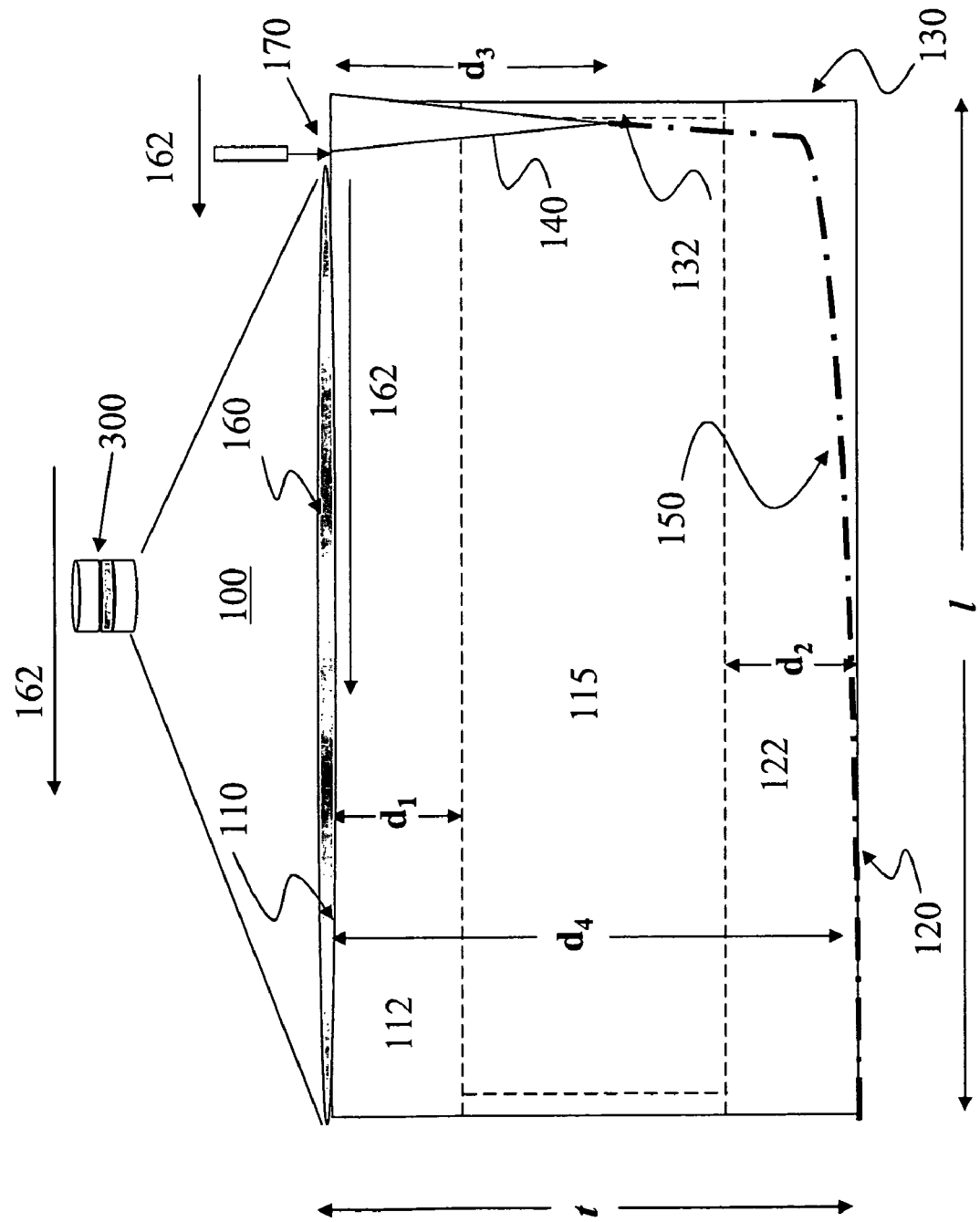
FIG. 2 is a schematic cross-sectional view of a strengthened glass sheet treated with a laser to create a vent.

A vent (150 in FIG. 2) is then formed in the strengthened glass sheet 100. Vent 150 originates at flaw 140 and extends along a vent direction which, in FIG. 2, is parallel to length l of strengthened glass sheet 100. Vent 150 breaks bonds at a molecular level within the glass and is formed at a vent depth $d_4$ that is greater than depth $d_1$ of strengthened layer 112. In one embodiment, vent 150 is full or total, and penetrates the entire thickness t of strengthened glass sheet 100. In another embodiment vent 150 is partial and does not penetrate the entire thickness t of strengthened glass sheet 100. A partial vent is also referred to as a "median crack."

Vent 150, in one embodiment, is formed by heating strengthened glass sheet 100 with a laser beam 160, and followed by quenching at initial flaw 140. The surface of strengthened glass sheet 100 in which flaw 140 is initiated is heated with laser beam 160. In FIG. 2, for example, flaw 140 is initiated in first surface 110, which is then heated with laser 160. Strengthened glass sheet 100 is heated by an elongated, elliptical laser beam 160, which locally heats strengthened glass sheet 100 along its entire length l to a temperature that is in a range from about 50° C. below the strain point of strengthened glass sheet 100 up to a temperature between the strain point and the anneal point of strengthened glass sheet 100. In some embodiments in which strengthened glass body 100 has been chemically strengthened by ion exchange, strengthened glass sheet 100 is heated by laser beam 160 to a temperature between the strain point and the anneal point. Combined with subsequent quenching applied at initial flaw 140, laser beam 160 establishes a temperature gradient and thus creates a tensile stress. The localized heating by laser beam 160 creates a tensile stress in the vent 150, and a compressive stress is created in the glass surrounding vent 150 to balance forces within strengthened glass sheet 100. Quenching of strengthened glass sheet 100 along vent 150 increases the temperature gradient and initiates fast extension of vent 150 through thickness t of strengthened glass sheet 100 and propagation of vent 150 along the vent direction or direction of separation, thus causing strengthened glass sheet 100 to separate along vent 150. In some instances, heating of strengthened glass sheet 100 alone is sufficient to separate strengthened glass sheet 100 without quenching. In other embodiments, however, quenching is desirable, as it allows separation of strengthened glass sheet 100 by heating to lower temperatures, and provides a measure of controllability (i.e., allows strengthened glass sheet to be separated along a predetermined line or plane in a controlled or guided fashion) to the separation process.

Laser beam 160 is translated across strengthened glass sheet 100 in direction 162 at a predetermined speed. Such translation may be accomplished by movement of laser beam 160, strengthened glass sheet 100, or both. The vent depth $d_4$ depends upon the translation speed, the length of laser beam 160, and, to some extent, the energy profile of laser beam 160. In one embodiment, the vent depth $d_4$ equals the thickness t of strengthened glass sheet 100, thus allowing full separation of the strengthened glass sheet into at least two pieces along a predetermined plane that is perpendicular to first surface 110 and second surface 120, and includes vent 150; e.g., strengthened glass sheet 100 is thus divided along a predetermined line l.

In those embodiments in which either the depth of layer $d_1$ is less than 20 μm or only one of surface layers 110, 120 is strengthened, vent depth $d_4$ is less than the thickness t of strengthened glass sheet 100. Under such conditions, partial separation of strengthened glass sheet 100 may, in some instances, be achieved. Strengthened glass sheet 100 is scored or weakened along vent 150. In these instances, strengthened glass sheet 100 is separated by creating a stress to separate the strengthened glass sheet 100 along the vent 150 into at least two pieces. In one embodiment, the stress is created by quenching strengthened glass sheet 100 immediately after heating with laser beam 160, creating a thermal gradient and a corresponding stress field. Quenching of an area or portion of strengthened glass sheet 100 along vent 150 is typically achieved using a coolant stream or jet (170 in FIG. 2) such as, a water jet, cooled gas, ethanol, a water/air mist, or the like, that follows laser beam 160 as it travels along a surface of strengthened glass sheet 100. Quenching stream or jet 170 can be positioned within the area of and trailing laser beam 160, or trail laser beam 160 at a distance ranging from about 1 mm up to about 100 mm. The diameter of the quenched coolant stream or jet 170 is typically limited in size to about 0.2-10 mm and is aligned with laser beam 160.

The size and intensity distribution of laser beam 160 are sufficient to enable efficient, gradual heating of strengthened glass sheet 100 through its entire thickness t, thus creating a vent 150 that that is much deeper than the depth $d_1$ of the compression layer 112. The speed at which laser beam 160 is translated across strengthened glass sheet 100, beam length, and the corresponding beam residence time are selected by taking the depth of compression layer 112 and overall thickness t into consideration. The power of laser beam 160 is also optimized to avoid heating strengthened glass sheet 100 to temperatures that are greater than the strain point of the glass, and, in some embodiments, greater than the anneal point. The power of laser beam 160 is also optimized to obtain a better quality (as represented, for example, by absence of chipping, low kerf, and low levels of debris generated) of the edge formed by separation using the methods described herein.

In one embodiment, elongated, elliptical laser beam 160 is created by using cylindrical lenses 300, and may have a length of at least about 300 mm. In another embodiment laser beam is elongated even further using scanning techniques that are known in the art. Such scanning techniques enable elongation of laser beam 160 to a length of at least 500 mm.

In one embodiment, vent 150 is generated by treating strengthened glass sheet 100 with laser beam 160 provided by a $CO_2$ laser having a wavelength of 10.6 μm. Due to surface absorption, $CO_2$ laser radiation does not penetrate deep into the strengthened glass sheet 100. The effective penetration depth of the 10.6 μm laser radiation is typically in the range of about 1-10 μm and depends on the absorption of the glass, beam length, and beam translation speed. However, the heat induced by the laser beam 160 penetrates through the thickness of the strengthened glass sheet 100 causing creation of the deep vent 150 through the strengthened glass sheet 100 to induce stress or, in some instances, full separation of the strengthened glass sheet 100.

Laser beam 160 may be elongated so as to be elliptical in shape. In one embodiment, the length or major axis of laser beam 160 is greater than or equal to the length l of the strengthened glass sheet 100 in the direction (or plane) along which the glass is separated. For example, strengthened glass sheets of up to 300 mm in length may be separated using a laser beam having a length of 300 mm.

The energy or intensity profile of laser beam 160 plays a role in the separation process. Various beam profiles and shaping techniques are known in the art, and may be used in the method described herein. For example, a laser beam having a classical Gaussian energy distribution (also referred to as "TEM00" or "S mode") may be used to score and separate a strengthened glass sheet. Alternatively, the "D-mode" (dual) distribution mode, a "flat-top" modification thereof, and combinations of D and flat-top modes provide a number of advantages. D and "flat-top" laser modes, which represent different blends of TEM01* (a mode comprising the two polarizations TEM01 and TEM10) and TEM00 (Gaussian "S") modes known in the art, are more effective than the S-mode in heating up the strengthened glass sheet without exceeding the strain point. Laser beam 160 has one of an S mode profile, a D mode profile and a flat top profile. D and flat-top modes allow the use of higher scoring speeds without generating excessive residual stress in the glass. Because the D and "flat top" modes have more uniform and wider energy profiles than the S mode, strengthened glass sheet 100 may be scored using a lower average power density within laser beam 160, therefore providing a wider process window than the S mode.

In a particular embodiment, the method described herein employs at least one fast axial flow $CO_2$ laser that is capable of operating in the S mode as well as in a bimodal regime, thus allowing laser beams with different intensity profiles to be obtained. In one non-limiting example, a $CO_2$ laser used in separating strengthened glass sheets as described herein operates in the dual distribution or "D mode," which is a blend consisting of approximately 60% of TEM01* mode and 40% of TEM00 mode. In addition, proper modification of the internal laser optics can allow changes in the TEM00/TEM01* ratio, which increases a portion of the TEM00 mode above 40% and eliminates (or minimizes) the central intensity dip in the resulting mode profile. The laser beam remains bimodal, but with a nearly "flat-top" mode profile. Both D and flat-top modes can be used for the method described herein. In some instances, the D-mode may be preferred due to its more gradual two-step heating profile. In addition, use of the D-mode facilitates heating of strengthened glass sheet 100 to temperatures that are below the strain point of the glass.

The length and width of laser beam 160 may be varied over a wide range and can be adjusted depending on the properties of strengthened glass sheet 100 and process speed requirements. Generally, a longer laser beam increases the time that a given volume of the strengthened glass sheet 100 is exposed to the laser beam. To score or separate chemically tempered aluminosilicate glass, for example, the beam length may be as long as about 200 mm and, in some embodiments, could be extended up to about 250 mm and, on other embodiments, up to about 300 mm and longer, thereby allowing preheating strengthened glass sheet 150 before thermal quenching. Alternatively, strengthened glass sheet may be preheated by a second elongated, elliptical laser beam (not shown) before being irradiated with laser beam 160 to allow separation of longer glass sheets. The second laser beam may be created, for example, by splitting laser beam 160 using those methods known in the art.

In the glass separating process, at least one of laser beam 160 and strengthened glass sheet 100 are translated with respect to each other in direction 162, allowing the median crack or laser vent to be formed along the plane or dividing line on which strengthened glass sheet 100 is to be scored or divided. The speed of translation or "scoring speed" depends upon the properties of the glass (e.g., composition, depth of layer, compressive stress, central tension, thickness) and the size, shape and intensity of laser beam 160. In one non-limiting example, a 1.3 mm thick aluminosilicate glass sheet that had not undergone ion exchange was scored (i.e., not fully separated) using a scoring speed of 750 mm/sec with a vent (median crack) depth of about 200 μm. In yet another example, aluminosilicate glass sheets that had undergone ion exchange by immersion in a pure $KNO_3$ bath at 410° C. for seven hours resulting in a depth of layer of about 51-53 μm and compressive stress of about 725 MPa, having a thickness of 1.3 mm and lengths of 150-200 mm, were fully separated using a laser beam having a length of 200 mm and a translation speed of 150 mm/sec.

A strengthened glass article, such as a strengthened glass plate or the like, that has been divided, cut, or separated by the methods described herein is also provided. The strengthened glass article has a first surface, a second surface substantially parallel to the first surface, and at least one edge joining the first and second surface. The glass article is strengthened, either chemically or by thermal tempering, as described herein, and has at least one of a first strengthened layer extending from the first surface to a first depth of layer and a second strengthened layer extending from the second surface to a second depth of layer. The at least one edge is formed by separating strengthened glass sheet 100, using the methods described hereinabove. In one embodiment, the at least one edge is an edge cut by irradiating a surface of a strengthened glass sheet. The at least one edge is formed along the plane at which strengthened glass sheet 100 is separated into at least two pieces and has an average edge strength of at least 200 MPa, as determined by horizontal four-point bend methods.

The strengthened glass article may be any glass that may be chemically or thermally strengthened. In one embodiment, the strengthened glass article is an alkali aluminosilicate glass, such as those previously described hereinabove.

The strengthened glass article is resistant to both chipping and scratching, and is well suited for use in cover plates for mobile communication and entertainment devices such as telephones, music players, video players, or the like; as a screen for portable computers; or in other applications that require strong and tough glass with good scratch resistance.

While typical embodiments have been set forth for the purpose of illustration, the foregoing description should not be deemed to be a limitation on the scope of the disclosure. Accordingly, various modifications, adaptations, and alternatives may occur to one skilled in the art without departing from the spirit and scope of the present disclosure.

The invention claimed is:

1. A method of separating a strengthened glass sheet into at least two pieces, the method comprising:
   a. providing the strengthened glass sheet,
      wherein said glass is an alkali aluminosilicate glass
      wherein said glass sheet has been strengthened by thermal tempering or by ion exchange in a molten salt bath;
      wherein the strengthened glass sheet has a strain point, an anneal point, a thickness, and a first surface and a second surface that are substantially parallel to each other and joined by a plurality of edges,
      wherein due to said strengthening at least one of the first surface and the second surface has a strengthened surface layer under a compressive stress of at least about 200 MPa, the strengthened surface layer extending at least about 20 μm from the respective surface to a depth of layer;
      wherein due to said strengthening a central region of the glass sheet is under a tensile stress, the central region located within the glass sheet between the first surface and the second surface and at a depth greater than the depth of layer,
   b. initiating a flaw at a flaw depth within the central region of the strengthened glass sheet, wherein the flaw is initiated by laser pulses having nanosecond length or less;
   c. forming a vent in the strengthened glass sheet by heating the surface of the strengthened glass sheet with a $CO_2$ laser beam having a wavelength of 10.6 μm at the location of the initial flaw followed by quenching at the location of the initial flaw to at least partially separate the strengthened glass sheet into the at least two pieces, wherein the vent originates at the initial flaw and wherein said vent is propagated from the initial flaw in a separation direction along the strengthened glass sheet at a vent depth that is greater than or equal to the depth of layer by translating the strengthened glass sheet or by translating the laser beam across one of the first surface and the second surface.

2. The method of claim 1, wherein the step of forming the vent in the strengthened glass sheet comprises irradiating the strengthened glass sheet with a laser beam and heating the strengthened glass sheet along a vent direction at the vent depth to a temperature in a range of at least 50° below the strain point up to a temperature between the strain point and the anneal point of the strengthened glass sheet to form the vent.

3. The method of claim 2, wherein the step of irradiating the strengthened glass sheet with a laser beam and heating the strengthened glass sheet along the vent direction at the vent depth to a temperature in a range from about 50° C. below the strain point up to a temperature between the strain point and the anneal point of the strengthened glass sheet comprises irradiating and heating the strengthened glass sheet through the entire thickness to separate the strengthened glass sheet along the vent into the at least two pieces.

4. The method of claim 2, wherein the temperature is between the strain point and the anneal point of the strengthened glass.

5. The method of claim 2, wherein the laser beam is an elongated elliptical beam.

6. The method of claim 5, wherein the strengthened glass sheet has a length, and wherein the elongated elliptical bean has a length that is greater than or equal to the length of the strengthened glass sheet.

7. The method of claim 5, wherein the elongated elliptical laser beam has a length of at least about 300 ram.

8. The method of claim 2, wherein the vent is propagated by a step of translating the laser beam across one of the first surface and the second surface.

9. The method of claim 2, wherein the laser beam is translated across one of the first surface and the second surface at a rate of up to 750 mm/s.

10. The method of claim 2, further including irradiating the strengthened glass sheet with a second elongated elliptical laser beam to preheat the strengthened glass sheet.

11. The method of claim 2, wherein the laser beam has one of an S mode profile, a D mode profile and a flat top profile.

12. The method of claim 1, further comprising the step of creating a stress to separate the strengthened glass sheet along the vent into the plurality of pieces.

13. The method of claim 12, wherein the step of creating a stress to separate the strengthened glass sheet along the vent into the plurality of pieces comprises quenching a portion of the strengthened glass sheet with a fluid after irradiating the strengthened glass sheet with the laser beam.

14. The method of claim 1, wherein the alkali aluminosilicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % $\leq Li_2O+Na_2O+K_2O \leq 20$ mol % and 0 mol % MgO+CaO $\leq 10$ mol %.

15. The method of claim 14, wherein the alkali aluminosilicate glass comprises: 64 mol % $\leq SiO_2 \leq 68$ mol %; 12 mol % $\leq Na_{2O} \leq 16$ mol %; 8 mol % $\leq Al_2O_3 \leq 12$ mol %; 0 mol % $\leq B_2O_3 \leq 3$ mol %; 2 mol % $\leq K_{2O} \leq 5$ mol %; 4 mol % $\leq MgO \leq 6$ mol %; and 0 mol % $\leq CaO \leq 5$ mol %, wherein: 66 mol % $\leq SiO_2+B_2O_3+CaO \leq 69$ mol %; $Na_2O+K_2O+B_2O_3+MgO+CaO+SrO>10$ mol %; 5 mol % $\leq MgO+CaO+SrO \leq 8$ mol %; $(Na_2O+B_2O_3)-Al_2O_3 \leq 2$ mol %; 2 mol % $\leq Na_2O-Al_2O_3 \leq 6$ mol %; and 4 mol % $\leq (Na_2O+K_2O)-Al_2O_3 \leq 10$ mol %, and wherein the glass has a liquidus viscosity of at least 130 kpoise.

16. The method of claim 14, wherein the alkali aluminosilicate glass is substantially free of lithium.

17. The method of claim 14, wherein the alkali aluminosilicate glass is substantially free of arsenic, antimony, and barium.

18. The method of claim 1, wherein the strengthened glass sheet is strengthened by ion exchange.

19. The method of claim 18, wherein the strengthened glass sheet has a central tension less than or equal to about 100 MPa.

20. A method of forming a vent in a strengthened glass sheet,
wherein said glass sheet is an alkali aluminosilicate glass having a first and a second surface;
wherein said glass sheet has been strengthened by thermal tempering or by ion exchange in a molten salt bath;
wherein the strengthened glass sheet has a strain point and an anneal point, a strengthened surface layer that is under a compressive stress of at least about 200 MPa which extends at least about 20 μm from at least one of the first surface and the second surface of the glass sheet to a depth of layer, and a central region located within the glass sheet between the first surface and the second surface and located at a depth greater than the depth of layer, the method comprising:
a. initiating a flaw at a flaw depth within central region of the strengthened glass sheet, wherein the flaw is initiated by laser pulses having nanosecond length or less; and
b. irradiating the strengthened glass sheet with a $CO_2$ laser beam having a wavelength of 10.6 μm at the location of the initial flaw and heating the glass along a vent direction at a vent depth to a temperature in a range from about 50° C. below the strain point up to a temperature between the strain point and the anneal point to form the vent, wherein the vent depth is greater than or equal to the depth of layer, and wherein the vent originates at and extends from the flaw.

21. The method of claim 20, wherein the laser beam is an elongated elliptical beam.

22. The method of claim 21, wherein the strengthened glass sheet has a length, and wherein the elongated elliptical bean has a length that is greater than or equal to the length of the strengthened glass sheet.

23. The method of claim 21, wherein the laser beam has one of an S mode profile, D mode profile and a flat top profile.

* * * * *